US005556153A

United States Patent [19]
Kelman et al.

[11] Patent Number: 5,556,153
[45] Date of Patent: Sep. 17, 1996

[54] INSTRUMENT PANEL ASSEMBLY

[75] Inventors: Josh Kelman, Dover; Lee E. Gridley, Ossipee, both of N.H.

[73] Assignee: Davidson Textron Inc., Dover, N.H.

[21] Appl. No.: 323,007

[22] Filed: Oct. 14, 1994

[51] Int. Cl.⁶ .................................................. B62D 25/08
[52] U.S. Cl. ................................. 296/70; 296/192; 180/90
[58] Field of Search .......................... 296/70, 192, 194, 296/208; 180/90; 454/127

[56] References Cited

U.S. PATENT DOCUMENTS

| | | | |
|---|---|---|---|
| 4,391,465 | 7/1983 | Piano | 296/208 |
| 4,646,879 | 3/1987 | Mahler et al. | 296/208 X |
| 4,733,739 | 3/1988 | Lorenz et al. | 180/90 |
| 5,005,898 | 4/1991 | Benedetto et al. | 296/194 |
| 5,088,571 | 2/1992 | Burry et al. | 180/90 |
| 5,311,960 | 5/1994 | Kukainis et al. | 296/70 X |
| 5,354,114 | 10/1994 | Kelman et al. | 296/208 X |
| 5,358,300 | 10/1994 | Gray | 296/208 X |
| 5,364,159 | 11/1994 | Kelman et al. | 296/208 X |

*Primary Examiner*—Joseph D. Pape
*Attorney, Agent, or Firm*—Reising, Ethington, Barnard & Perry

[57] ABSTRACT

An instrument panel assembly includes an instrument panel carrier, a top panel and a front of dash panel of one-piece molded plastic construction. The top panel includes an upper housing part and the front of dash panel includes a lower housing part that cooperatively form a housing for components of a heating, ventilating and air conditioning system when the top and front close-out panels are attached to the instrument panel carrier. Each panel also cooperates with the instrument panel to form an air distribution duct for the heating, ventilating and air conditioning system that communicates with the housing formed by the two panels.

3 Claims, 2 Drawing Sheets

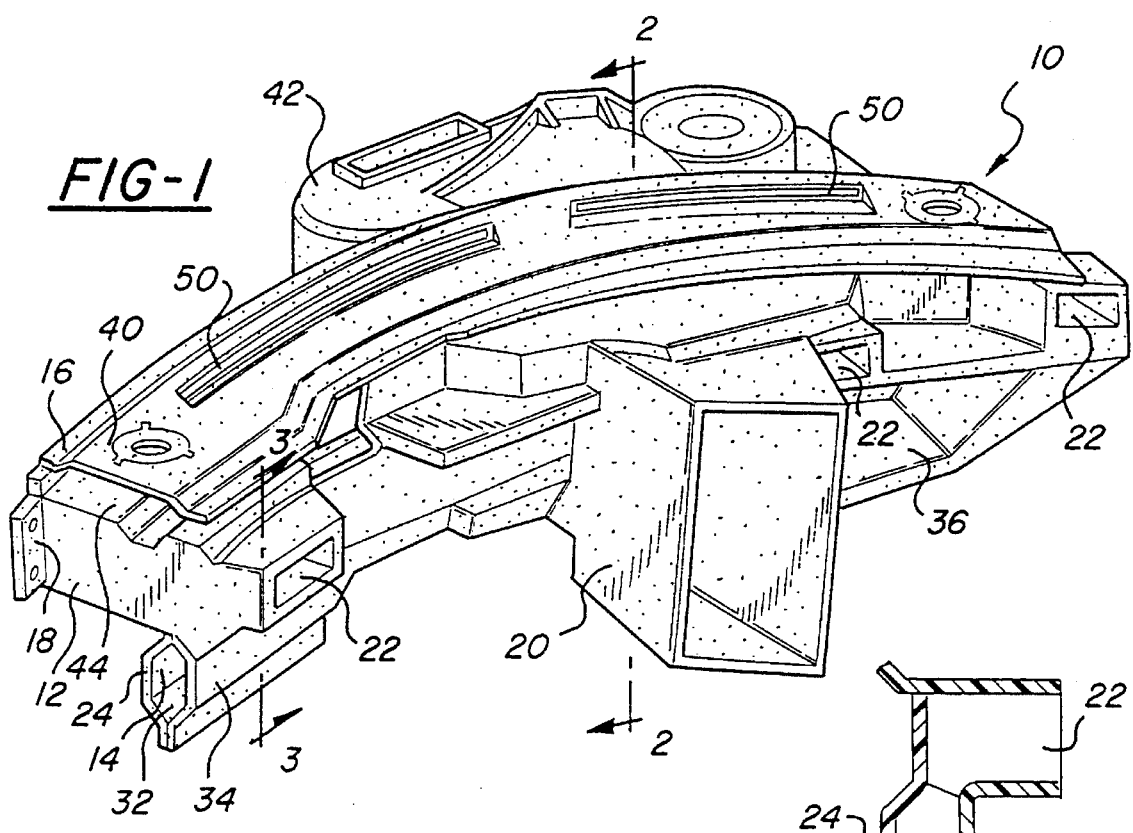
FIG-1
FIG-3
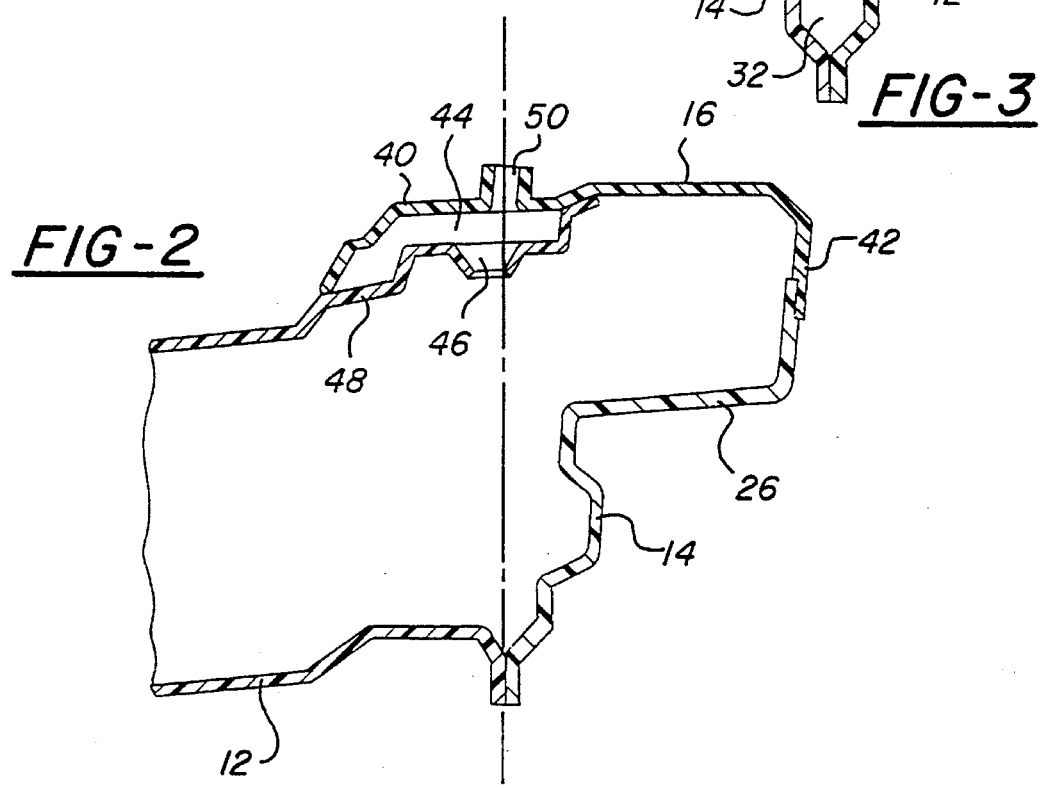
FIG-2

INSTRUMENT PANEL ASSEMBLY

BACKGROUND OF THE INVENTION

This invention relates generally to instrument panel assemblies for automobiles and more particularly to an instrument panel assembly for use in automobiles equipped with a heating, ventilating and air conditioning system.

U.S. Pat. No. 4,391,465 granted to Renzo Piano Jul. 5, 1983 discloses an assembly comprising a first element or firewall and a second element or instrument panel. The firewall has an upper portion that supports the instrument panel and integral housings for accommodating members and devices of a heating and ventilation system. The firewall also generates with the instrument panel cavities and channels for the heating and ventilation system that are not disclosed in detail.

U.S. Pat. No 4,733,739 granted to Siegfried Lorenz et al Mar. 29, 1988 discloses an instrument panel of plastics material having an integrated ventilating and heating unit. The instrument panel comprises a central support part, a lower support part, a blower cover and an instrument panel covering. The central support part supports the blower and the cold heat exchanger components of a heating, ventilating and air conditioning system in a chamber that is closed by the blower cover and an auxiliary cover.

U.S. Pat. No. 5,005,898 granted to Piero Benedetto, Salvatore Bezzi and Paola Odone Apr. 9, 1991 discloses a vehicle structure comprising a front of dash panel for closing an opening between a passenger compartment and an engine compartment and an instrument panel that is mounted directly against the face of a rigid element of the front of dash panel. An air conditioning unit is fixed on the front of dash panel below a central portion of the instrument panel. The patent specification indicates that the instrument panel has internal ducts. However, the patent drawings and specification do not reveal any detail of the heating and ventilating ducts.

U.S. Pat. No. 5,088,571 granted to Donald L. Burry and Leonard J. Pilato Feb. 18, 1992 discloses a standardized or generic modular structural instrument panel carrier and a molded plastic instrument panel cover. The structural instrument panel carrier comprises two panels of fiber reinforced plastic material that are attached together to form a box beam that is an integral load bearing structure of the vehicle body and that also provides a single air transfer duct across the vehicle that communicates with air outlet openings spaced along the length of the duct. A large opening is provided in one of the panels to accommodate the entry and mounting of a heating, ventilating, and air conditioning unit that has an outlet that communicates with the air transfer duct.

Pending patent application Ser. No. 078,140 filed Jun. 15, 1993 and assigned to the assignee of this invention discloses an instrument panel carrier that supports a heating, ventilating and air conditioning unit, an air distribution duct that extends along the back of the instrument panel carrier, and laterally spaced air outlet members.

Pending patent application Ser. No. 140,881 filed Oct. 25, 1993 and assigned to the assignee of this invention shows a modular assembly for a vehicle body that includes a front of dash panel, a close out panel and an instrument panel carrier that are secured to together to form two vertical row of ducts. The front of dash panel has a central portion that cooperates with a central portion of the close out panel to form a housing for a heating, ventilating and air conditioning unit.

Pending patent application Ser. No. 229,006 filed Apr. 18, 1994 and assigned to the assignee of this invention discloses an instrument panel that has a substructure that extends across the width of an automotive passenger compartment. The substructure has a lower channel that cooperates with a front channel that is attached to the substructure to provide a cross car duct for wiring or air distribution and a box structure that absorbs energy when knee bolsters attached to the substructure are impacted.

SUMMARY OF THE INVENTION

The object of this invention is to provide a an instrument panel assembly that provides several components of a heating, ventilating and air conditioning system for an automobile with a minimum number of parts.

A feature and advantage of the invention is that the instrument panel assembly has three major structures of one-piece molded plastic construction that combine to provide a housing for components of the heating, ventilating and air conditioning system as well as an air distribution duct for the system.

Another feature and advantage of the invention is that the instrument panel assembly has three major structures of one-piece molded plastic construction that combine to provide a housing for components of the heating, ventilating and air conditioning system as well as two distinct air distribution ducts for the system that communicate with the housing for distributing air to two different sets of air outlets for different purposes.

Still another feature and advantage of the invention is that the instrument panel assembly has three major structures of one-piece molded plastic construction that combine to provide a housing for components of the heating, ventilating and air conditioning system as well as two distinct cross car air distribution ducts for the system that communicate with the housing for distributing air to one set of air outlets directed to the passenger compartment and another set of air outlets directed to the windshield.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 1 is a perspective view of an instrument panel assembly of the invention;

FIG. 2 is a sectional view of the instrument panel assembly taken substantially along the line 2—2 of FIG. 1 looking in the direction of the arrow;

FIG. 3 is a sectional view of the instrument panel assembly taken substantially along the line 3—3 of FIG. 1 looking in the direction of the arrow.

DESCRIPTION OF THE INVENTION

Figure 4:
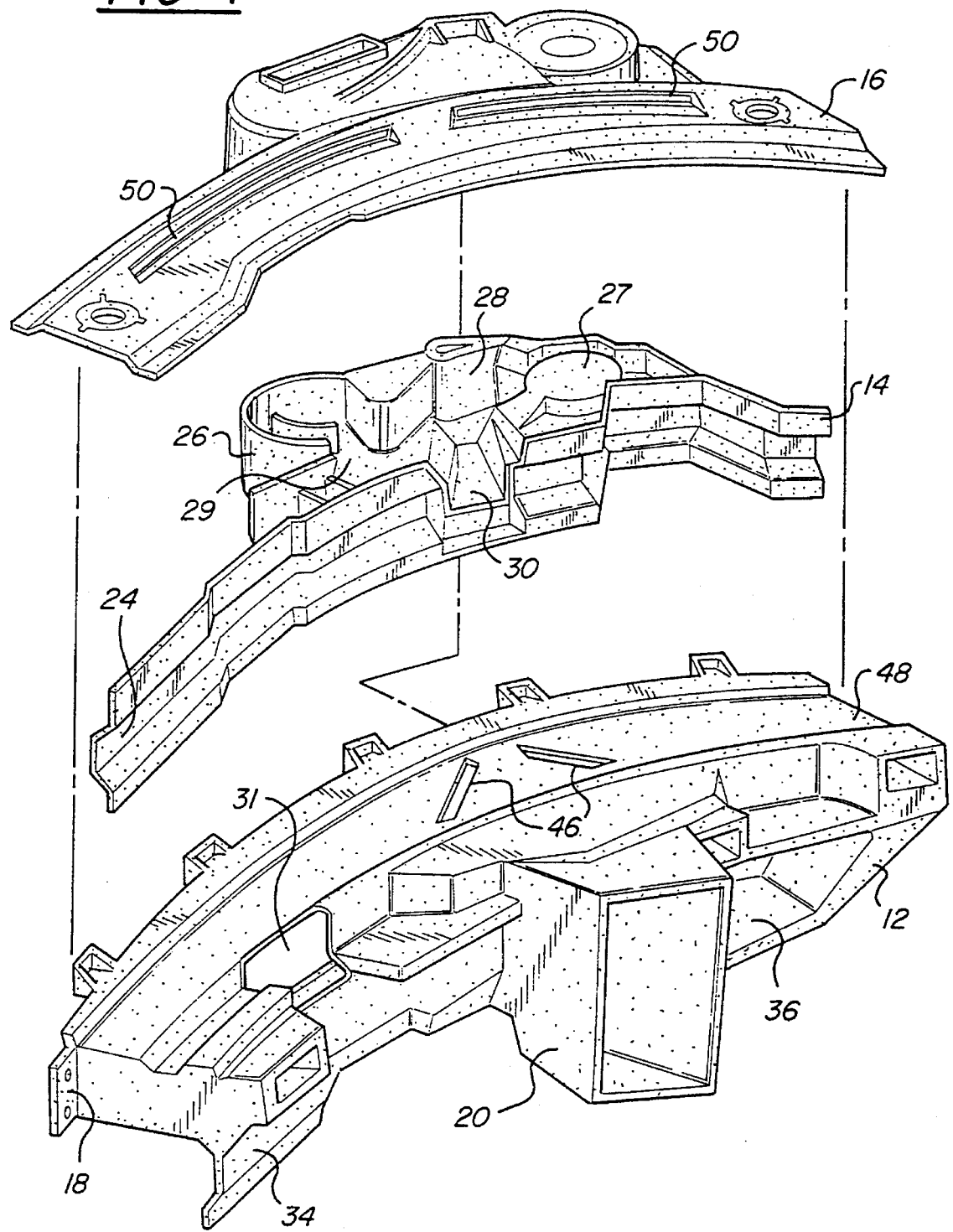
FIG. 4 is an exploded perspective view of the instrument panel assembly shown in FIG. 1.

Referring now to the drawing, an instrument panel assembly 10 of the invention is shown to comprise three major, shaped structures of one piece, molded plastic construction. These three major shaped structures are an instrument panel carrier 12, a front of dash panel 14, and a top panel 16.

The instrument panel carrier 12 conventionally extends across the full width of the passenger compartment and has end portions 18 that secure the instrument panel carrier 12 to the side stations or "A" pillars of the automobile body (not shown). In this regard reference may be had to the three pending patent applications identified above which are hereby incorporated in this patent specification by reference.

The instrument panel carrier 12 is typically molded of a structural or engineered plastic material such as polycarbonate, rigid polyurethane, or polypropylene and such material may be filled with glass fibers, talc, or other fillers for increased strength.

The instrument panel carrier 12 is designed to support the various components that are typically found on an instrument panel. These typically include an instrument cluster, a radio, a tape or disc player, a glove box, and controls and components for the heating, ventilating, and air conditioning system of the automobile. Moreover, this particular instrument panel carrier 12 includes a central stack portion 20 which in keeping with modern instrument panel design is used to support the heating, ventilating and air conditioning controls within easy reach of the driver. Radios, tape players, and disc players are also typically supported in the central stack portion 20.

The instrument panel carrier 12 includes a plurality of air outlets 22 for the heating, ventilating and air conditioning system which are typically spaced along the face of the instrument panel carrier as shown in the drawings.

The front of dash panel 14 comprises a duct close out member 24 and a lower housing part 26. The duct close out member 24 is a vertical strip of hat shaped section that is contoured to fit in front of the lower portion of the instrument panel carrier 12, that is, toward the engine compartment of the automobile. The lower housing part 26 is integrally attached to and projects forwardly of the duct close out member 24. It has an inlet controlled by a valve 28 and an outlet 30 that intersects the duct close out member 24 in alignment with the central stack portion 20 of the instrument panel carrier 12. The lower housing part 26 also includes portions for supporting components of the heating, ventilating and air conditioning system, such as portion 27 for a fan or blower and portion 29 for an evaporator or heat exchanger.

The front of dash panel 14 is attached to the instrument panel carrier 12 so that an elongated air distribution duct 32 extends from one end of the instrument panel assembly 10 to the other. This air distribution duct 32 is formed by the hat shaped, duct close out member 24 and a cooperating lower portion 34 of the instrument panel carrier 12 which includes a portion passing under the steering column (not shown) and a portion behind a glove box cavity 36 in the passenger side of the instrument panel assembly 10. The portion of the air distribution duct 32 passing under the steering column can be re placed by a separate duct section (not shown) which can be removed to facilitate installation of the steering column.

The air distribution duct 32 communicates with the housing outlet 30 for delivering ambient or conditioned air to the passenger compartment via the several air outlets 22 in the instrument panel carrier 12 that are directed toward the passenger compartment. The air outlets 22 typically communicate with the air distribution duct 32 as shown in FIG. 3.

The top panel 16 comprises a duct close out member 40 in the form of a horizontal channel shaped strip, and an upper housing part 42. The upper housing part 42 is integrally attached to and extends forwardly of the channel shaped duct close out member 40. The upper housing part 42 provides the upper portions of the inlet that is controlled by the valve 28 and the upper part of the outlet 30 that intersects the duct close out member 24 in alignment with the central stack portion 20 of the instrument panel carrier 12. The upper housing part 42 also includes portions that complete those portions of the lower housing part 28 that support the blower, etc.

The top panel 16 is attached to the instrument panel carrier 12 so an elongated air distribution duct 44 is formed across the top of the instrument panel carrier 12 that communicates with the outlet 30 via slots 46 that are located forwardly of the stack portion 20. The elongated air distribution duct 44 is formed by the channel shaped, duct close out member 40 and a cooperating forward, upper shelf portion 48 of the instrument panel carrier 12. The duct close out member 40 also includes slots 50 on either side of the central stack portion 20 for directing ambient or conditioned air onto the windshield of the automobile (not shown).

The front of dash panel 14 and the top panel 16 are typically molded of a relatively rigid plastic material such as the plastic materials used for the instrument panel carrier 12. These panels, however, normally do not require as much strength, so that the plastic material is seldom filled with glass fibers or other strengtheners.

In addition, the instrument panel carrier 12 and the top panel 16 are conventionally covered for decorative or aesthetic purposes. The decorative covering is typically a thermoplastic skin that may or may not include an underlying foam cushion layer.

When an underlying foam cushion layer is desired, an expanded vinyl or polyurethane material may be used. Alternatively a skin of a castable thermoplastic material such as polyvinyl chloride, can be cast separately and then placed in a mold cavity in a spaced relationship with a substrate such as the instrument panel carrier 12 or the top panel 16. The foam cushion is then formed in place between the skin and the substrate using a foam precursor material that generates an elastomeric foam such as elastomeric polyurethane.

In any event, whether covered or not, the three major shaped structures 12, 14 and 16 of the instrument panel assembly 10 are assembled in the following manner. The front of dash panel 14 is first attached to the instrument panel carrier 12 in a suitable manner, for instance by welding or bonding the upper and lower flanges of the hat shaped duct close out member 24 to abutting portions of the instrument panel carrier 12. This provides the air distribution duct 32 for the passenger compartment, and the lower housing part 26 for housing components of the heating, ventilating and air conditioning system.

The heating ventilating, and air conditioning components are then assembled into the lower housing part 26. The top panel 16 is then attached to the instrument panel carrier 12 and the front panel 14 in a suitable manner, for instance by welding or bonding the front and rear flanges of the channel shaped duct close out member 40 to abutting portions of the instrument panel carrier 12 and the upper and lower housing parts 26, 42 to each other to complete at least the substructure of the instrument panel assembly 10 which as indicated above may also include decorative coverings. It should be noted that the housing parts are preferably designed with an overlapping seam as shown in FIG. 2 which may be used to secure the housing parts together.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. An instrument panel assembly for use in an automobile having a heating, ventilating, and air conditioning system comprising:

an instrument panel carrier of one piece molded plastic construction, a front of dash panel of one piece molded plastic construction having a lower housing part having portions for supporting components of the heating, ventilating and air conditioning system, and a top panel of one piece molded plastic construction having an upper housing part, one of said panels having a duct close out member, one of said panels having air outlets, and the instrument panel carrier, the front of dash panel and the top panel being secured to each other so that the upper and lower housing parts cooperate to provide a housing for the components of the heating, ventilating, and air conditioning system and so that the duct close out member cooperates with the instrument panel carrier to provide an air distribution duct that communicates with the housing and the air outlets.

2. An instrument panel assembly for use in an automobile having a heating, ventilating, and air conditioning system comprising:

an instrument panel carrier of one piece molded plastic construction having air outlets, a front of dash panel of one piece molded plastic construction having a duct close out member and a lower housing part having portions for supporting components of the heating, ventilating and air conditioning system, and a top panel of one piece molded plastic construction having a duct close out member, air outlets and an upper housing part, the instrument panel carrier, the front of dash panel and the top panel being secured to each other so that the upper and lower housing parts cooperatively provide a housing for the components of the heating, ventilating, and air conditioning system and so that the duct close out members cooperate with the instrument panel carrier to provide two air distribution ducts that communicate with the housing and the air outlets in the instrument panel carrier and the air outlets in the top panel.

3. An instrument panel assembly for use in an automobile having a heating, ventilating, and air conditioning system comprising:

an instrument panel carrier of one piece molded plastic construction, a front of dash panel of one piece molded plastic construction having a duct close out member in the shape of a vertical strip having a hat shaped section and a lower housing part that extends forwardly of the duct close out member, the front of dash panel being attached to the instrument panel carrier so that the duct close out member cooperates with a lower portion of the instrument panel carrier to form a first elongated air distribution channel that communicates with a plurality of air outlets spaced along the length of the instrument panel carrier, a top panel of one piece molded plastic construction having a duct close out member in the form of a horizontal channel and an upper housing part that projects forwardly of the duct close out member, the top panel being attached to the instrument panel carrier and the front of dash panel so that the duct close out member cooperates with a forward shelf portion of the instrument panel carrier to form a second elongated air distribution channel that communicates with a plurality of air outlets spaced along the length of the top panel and so that the upper and lower housing parts form a housing for components of the heating, ventilating and air conditioning system that communicates with the first and the second air distribution channels.

* * * * *